No. 611,118. Patented Sept. 20, 1898.
A. C. GRUBE.
POPCORN PRESS.
(Application filed Sept. 3, 1897.)
(No Model.)
2 Sheets—Sheet I.
FIG. I
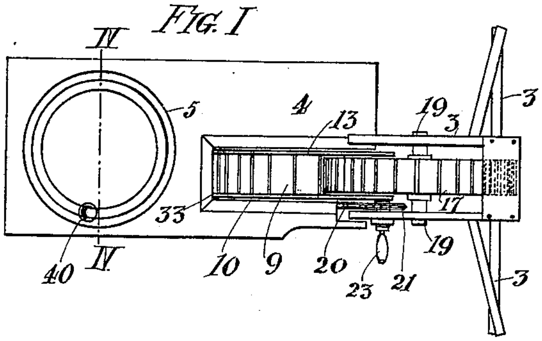
FIG. IV.
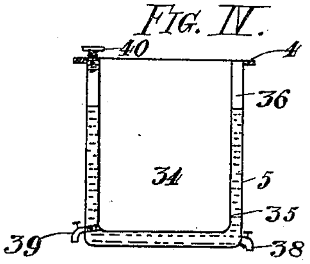
FIG. II.
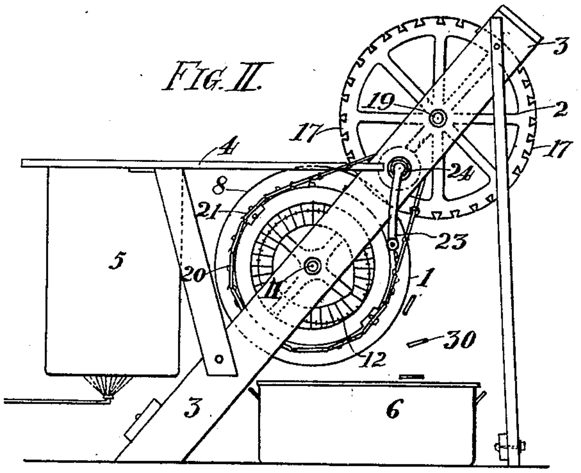
FIG. V.
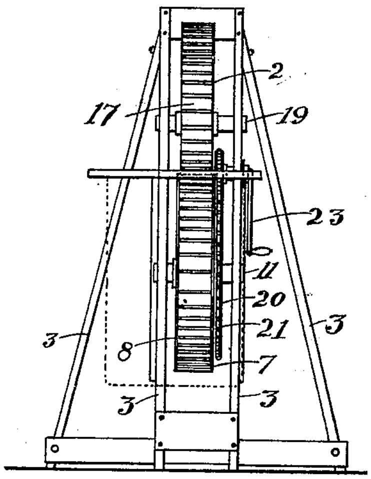
FIG. III.
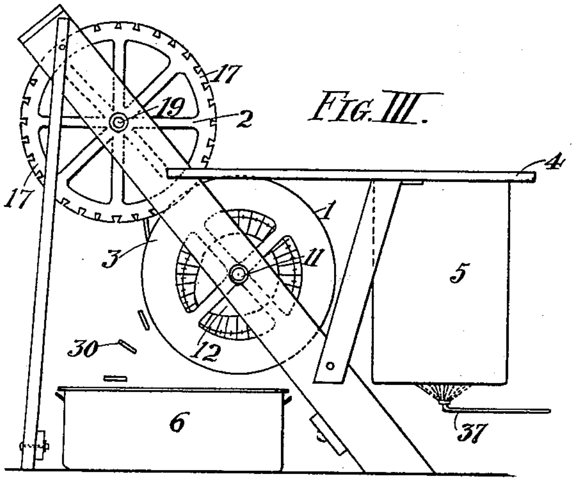
FIG. VI
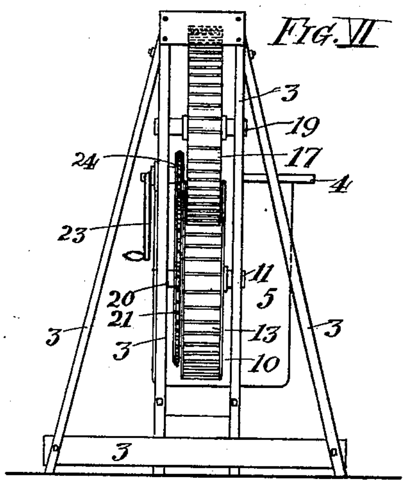
Witnesses:
Robt. Fram.
J. A. Roelofsz
Inventor.
A. C. Grube.
by
Knight Bros.
Attorneys.
THE NORRIS PETERS CO., PHOTO-LITHO., WASHINGTON, D. C.

No. 611,118. Patented Sept. 20, 1898.
A. C. GRUBE.
POPCORN PRESS.
(Application filed Sept. 3, 1897.)
(No Model.) 2 Sheets—Sheet 2.
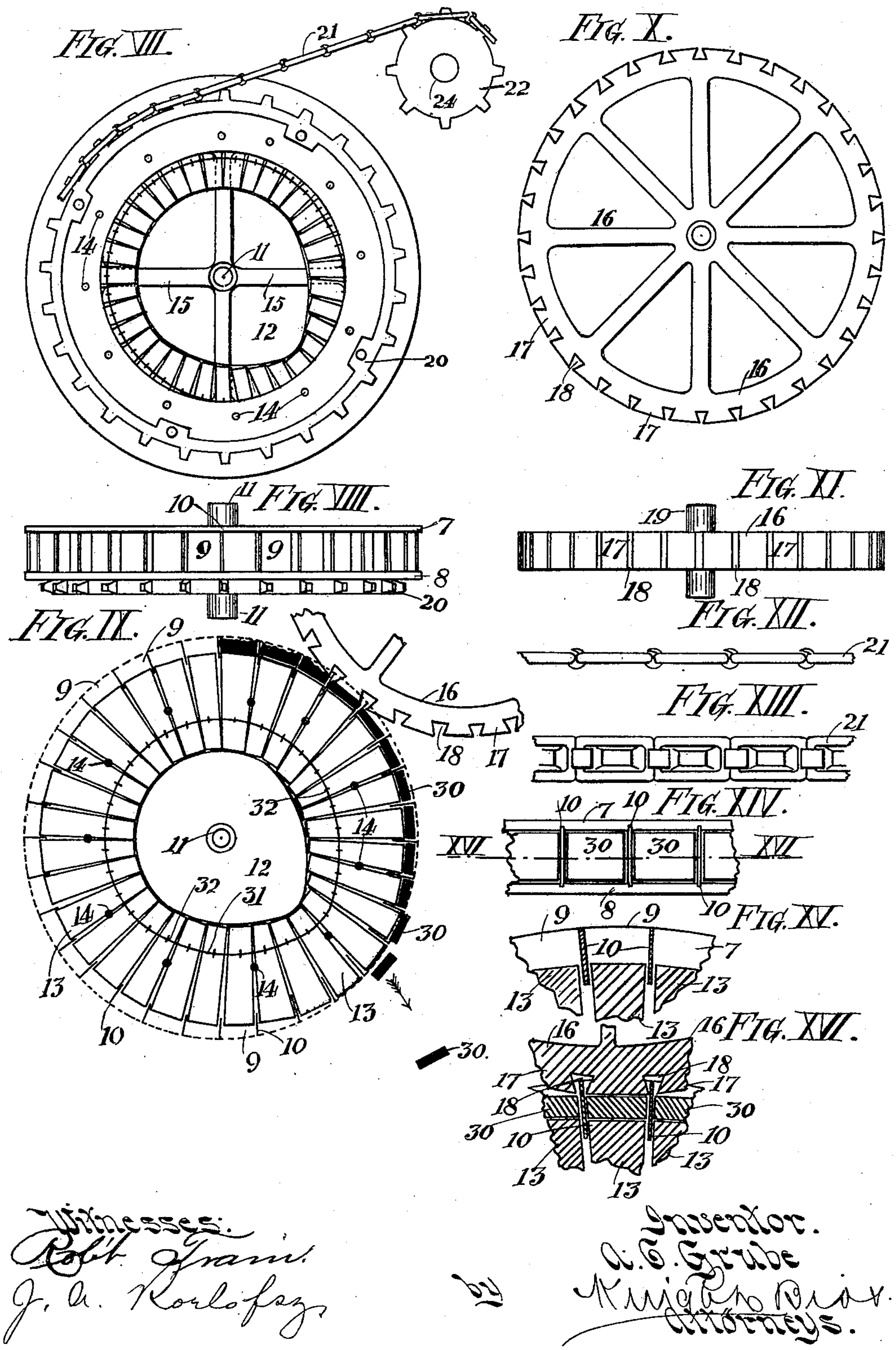
Witnesses:
Inventor.
A. C. Grube
by Knight Bros.
Attorneys.
THE NORRIS PETERS CO., PHOTO-LITHO., WASHINGTON, D. C.

UNITED STATES PATENT OFFICE.

AARON C. GRUBE, OF LOS ANGELES, CALIFORNIA, ASSIGNOR OF ONE-HALF TO WILLIAM J. SOFIELD, OF PEORIA, ILLINOIS.

POP-CORN PRESS.

SPECIFICATION forming part of Letters Patent No. 611,118, dated September 20, 1898.

Application filed September 3, 1897. Serial No. 650,436. (No model.)

*To all whom it may concern:*

Be it known that I, AARON C. GRUBE, a citizen of the United States, residing at Los Angeles, in the county of Los Angeles and State of California, have invented certain new and useful Improvements in Pop-Corn Presses, of which the following is a full, clear, and exact description, reference being had to the accompanying drawings, which form a part of this specification.

My invention relates to a machine for pressing pop-corn into a compact shape, which may be termed "bricks" or "tablets;" and my invention consists in certain features of novelty hereinafter described and claimed.

Figure I is a top view of my improved machine. Fig. II is a side elevation. Fig. III is a side elevation showing the opposite side from Fig. II. Fig. IV is a vertical section taken on line IV IV, Fig. I, showing the receptacle for holding the popped corn previous to its being pressed into bricks, means being shown for keeping the popped corn and syrup, with which it is mixed, in a heated condition in order to maintain the proper consistency. Fig. V is a rear elevation. Fig. VI is a front elevation. Fig. VII is an enlarged detail side elevation of the wheel containing the operating-plungers. Fig. VIII is a top view of the plunger-wheel. Fig. IX is a detail view showing plunger-wheel with one side of the wheel removed to show construction of plunger and showing pressing-wheel engaging the plunger-wheel. Fig. X is a side elevation of the pressing-wheel. Fig. XI is a top view of the pressing-wheel. Fig. XII is a view of sprocket-chain for operating the plunger-wheel. Fig. XIII is an enlarged detail plan view of sprocket-chain. Fig. XIV is an enlarged detail plan view of plunger-wheel, showing pop-corn bricks in position. Fig. XV is an enlarged detail vertical section showing plungers and molds. Fig. XVI is a vertical section taken on line XVI XVI, Fig. XIV.

Referring to the drawings, 1 represents the plunger-wheel; 2, the pressure-wheel; 3, the framework supporting said wheels and to which they are journaled; 4, the operating-table; 5, a receptacle for holding the unpressed pop-corn, and 6 a pan for receiving the pressed bricks of pop-corn as they fall from the machine in their finished state.

The plunger-wheel consists of two flanges 7 8, set some distance apart, thus forming a hollow wheel the periphery of which is open and in which is a series of molds or pockets 9, said molds extending entirely around the periphery of the wheel and being divided by steel plates 10, said steel plates 10 extending from the flange 7 to the flange 8 and placed at intervals in order to form a series of molds or pockets, as before mentioned.

11 represents a shaft fixed to the frame 3. On the shaft 11 is placed a cam 12, which is also fixed.

13 represents a series of wedge-shaped plungers operating within the hollow plunger-wheel and carried around with the same, the inner ends of said plungers riding against the face of the cam 12 and the outer ends of the plungers extending into the molds 9, formed by the steel cross-strips 10.

14 represents a series of bolts securing the flanges 7 8 of the hollow plunger-wheel together, said bolts extending between certain of the plungers.

15 represents spokes connecting the flange 7 of the plunger-wheel with the shaft 11, thus forming a support and bearing for the plunger-wheel, said wheel revolving around said shaft when the machine is in operation.

16 represents the pressure-wheel, having a series of dies 17 on its periphery, the number of said dies corresponding with the molds in the plunger-wheel. Said dies are preferably made in the form of a keystone with the base extending outwardly, with intervening spaces 18 between the dies, said spaces being also preferably of keystone shape, with the base or largest portion of said space on a line with the inner portion of the die, with the result that the space between said dies at their outer edge is less than where said dies join the pressure-wheel proper, the object of which will be explained farther on. The pressure-wheel 16 is journaled to a shaft 19, which rests in the frame 3, said pressure-wheel being slightly in advance of the plunger-wheel and having its axis higher than the axis of the plunger-wheel, the frame preferably being inclined in order to support both wheels in the position described.

20 represents a sprocket-wheel secured to the flange 8 of the plunger-wheel, with which engages a sprocket-chain 21, passing over a smaller sprocket-wheel 22.

23 represents a crank connected with the shaft 24 of the sprocket-wheel 22 for operating the plunger-wheel, the sprocket-wheel 22 being rotated, causing the sprocket-chain 21 to rotate the plunger-wheel. As the plunger-wheel is rotated the dies 17 on the pressure-wheel mesh into the molds 9 in the plunger-wheel. (See Fig. IX.) The operator places the popped corn, with a suitable syrup, into the molds 9 as the wheel revolves, keeping the upper molds filled, and as the plunger-wheel revolves the dies 17 of the pressure-wheel extend into the molds and press against the outer surface of the popped corn placed in the molds, and as the plungers 13 ride upon the cam 12 the pop-corn is pressed into bricks 30 between the outer end of the plunger and the dies on the pressure-wheel. After the dies of the pressure-wheel pass out of contact with the molds the plungers continue to ride up on the cam until they reach its apex or highest point, at which time the pressed bricks are thrown out of the plunger-wheel, the plungers when they have reached the highest point of the cam also extending to the outer face of the plunger-wheel. The cam is so arranged as to have its highest point below the center of the plunger-wheel, so that the discharge of the popped-corn bricks in their finished state is aided by gravity. (See Fig. IX.) The spaces between the dies on the pressure-wheel being larger on the inside or inner ends of the dies permits of the proper movement of the strips 10, forming the wall between the molds, and prevents the same from binding in said spaces, the outer portion of said space being narrow, so as to give as great a surface to the dies as possible. The plungers are carried around on the face of the cam in the open plunger-wheel, their upper ends finding a bearing in the division-strips 10 and being movably connected near their lower ends by means of a flexible cord 31, passing through staples 32 on the sides of the plungers, this flexible-cord connection allowing the plungers to move endwise independently of each other. After the plungers have passed the highest point upon the cam 12 they again recede, as shown in Fig. IX, leaving the molds open ready to receive a fresh supply of the popped corn, the operation being a continuous one, there being no necessity of stopping the machine to place the popped corn in position, the table 4 being provided with a longitudinal opening 33, so that as the plunger-wheel revolves a number of the molds are exposed at the same time, permitting the operator to feed the popped corn rapidly through said opening into the molds with one hand, while with the other hand he is operating the crank 23 and turning out the completed product at the opposite side of the plunger-wheel.

The receptacle 5 is composed of an inner vessel 34, having an outer jacket 35, with an intervening space 36, in which water may be placed for keeping the corn and syrup mixed therewith in a properly-heated condition, 37 representing a gas-jet or other suitable means for heating the receptacle 5.

38 represents a stop-cock connected with the receptacle 5, through which the space 36 may be drained.

39 represents a stop-cock connected with the inner vessel 34, which may be opened when it is desired to clean the same.

40 represents a screw-cap for closing the top of the space 36 and through which water may be introduced.

I claim as my invention—

1. In a pop-corn press the combination, of a wheel having a series of molds, a series of plungers movably supported in said wheel, a cam for giving outward direction to said plungers and means for connecting said plungers movably to each other, substantially as set forth.

2. In a pop-corn press the combination, of an open wheel having a series of molds on its periphery, a series of radially-extending plungers, a cam upon which the inner ends of said plungers ride, and a flexible cord connecting said plungers with each other, substantially as set forth.

3. In a pop-corn press the combination of an open wheel having a series of molds, a series of movable plungers, flanges located on each side of said plungers, cross-rods extending through said flanges and between the plungers, and a cam for giving outward direction to said plungers, substantially as set forth.

4. In a pop-corn press the combination, of an open wheel, a series of plungers, a series of molds, means for moving said plungers, a pressure-wheel having a series of dies adapted to enter said molds and intervening spaces between said dies adapted to straddle the division-walls between the adjoining molds, substantially as set forth.

5. In a pop-corn press the combination, of a wheel having a series of plungers, a series of molds, division-strips between the molds, a pressure-wheel having a series of dies which decrease in width inwardly, and a series of spaces between said dies which increase in width inwardly and means for operating said mechanism, substantially as set forth.

The foregoing specification signed at Los Angeles, California, this 27th day of August, 1897.

AARON C. GRUBE.

In presence of—
CHAS. R. DELLMANN,
J. W. KEMP.